(12) United States Patent
Fujio

(10) Patent No.: US 11,148,887 B2
(45) Date of Patent: Oct. 19, 2021

(54) CONVEYING AND SORTING APPARATUS

(71) Applicant: Daifuku Co., Ltd., Osaka (JP)

(72) Inventor: Yoshihiko Fujio, Shiga (JP)

(73) Assignee: Daifuku Co., Ltd.

( * ) Notice: Subject to any disclaimer, the term of this patent is extended or adjusted under 35 U.S.C. 154(b) by 0 days.

(21) Appl. No.: 16/941,262

(22) Filed: Jul. 28, 2020

(65) Prior Publication Data

US 2020/0354164 A1 Nov. 12, 2020

Related U.S. Application Data

(63) Continuation of application No. PCT/JP2019/010359, filed on Mar. 13, 2019.

(30) Foreign Application Priority Data

Apr. 27, 2018 (JP) .............................. JP2018-086872

(51) Int. Cl.
*B65G 47/94* (2006.01)
*B65G 41/00* (2006.01)

(52) U.S. Cl.
CPC ......... *B65G 47/945* (2013.01); *B65G 41/002* (2013.01); *B65G 2203/0233* (2013.01); *B65G 2203/044* (2013.01)

(58) Field of Classification Search
CPC ................ B65G 47/945; B65G 41/002; B65G 2203/0233; B65G 2203/044
USPC .................................................... 198/370.04
See application file for complete search history.

(56) References Cited

U.S. PATENT DOCUMENTS

| 6,193,074 B1* | 2/2001 | Baum .................. B65G 47/962 198/370.04 |
| 7,128,202 B2* | 10/2006 | Balk ..................... B65G 17/14 198/704 |
| 2020/0354163 A1* | 11/2020 | Fujio .................... B65G 47/945 |

(Continued)

FOREIGN PATENT DOCUMENTS

| JP | 05155420 A | 6/1993 |
| JP | 2007269478 A | 10/2007 |

(Continued)

*Primary Examiner* — Gene O Crawford
*Assistant Examiner* — Lester Rushin, III
(74) *Attorney, Agent, or Firm* — St. Onge Steward Johnston & Reens LLC

(57) ABSTRACT

A conveying and sorting apparatus has a plurality of tilting conveyor units in a row in a conveying direction, and reflective photoelectric sensors. The tilting conveyor units are supported above a frame so as to be able to swing to the left and right about a support shaft which is parallel with the conveying direction, between a horizontal conveying orientation and a tilted orientation for ejecting the object being conveyed, by means of gravity, in the lateral direction with respect to the conveying direction. The reflecting photoelectric sensors detect objects being conveyed which pass between the tilting conveyor units by means of light beams which pass, in the vertical direction, between tilting conveyor units which adjoin one another in the conveying direction. The reflecting photoelectric sensors are attached to a support member which surrounds the periphery of the support shaft and which is supported by the frame.

5 Claims, 10 Drawing Sheets

(56) References Cited

U.S. PATENT DOCUMENTS

2020/0354164 A1* 11/2020 Fujio .................. B65G 47/46
2020/0361719 A1* 11/2020 Fujio .................. B65G 47/82

FOREIGN PATENT DOCUMENTS

| JP | 2015501770 A | 1/2015 |
| WO | 2013075714 A1 | 5/2013 |

* cited by examiner

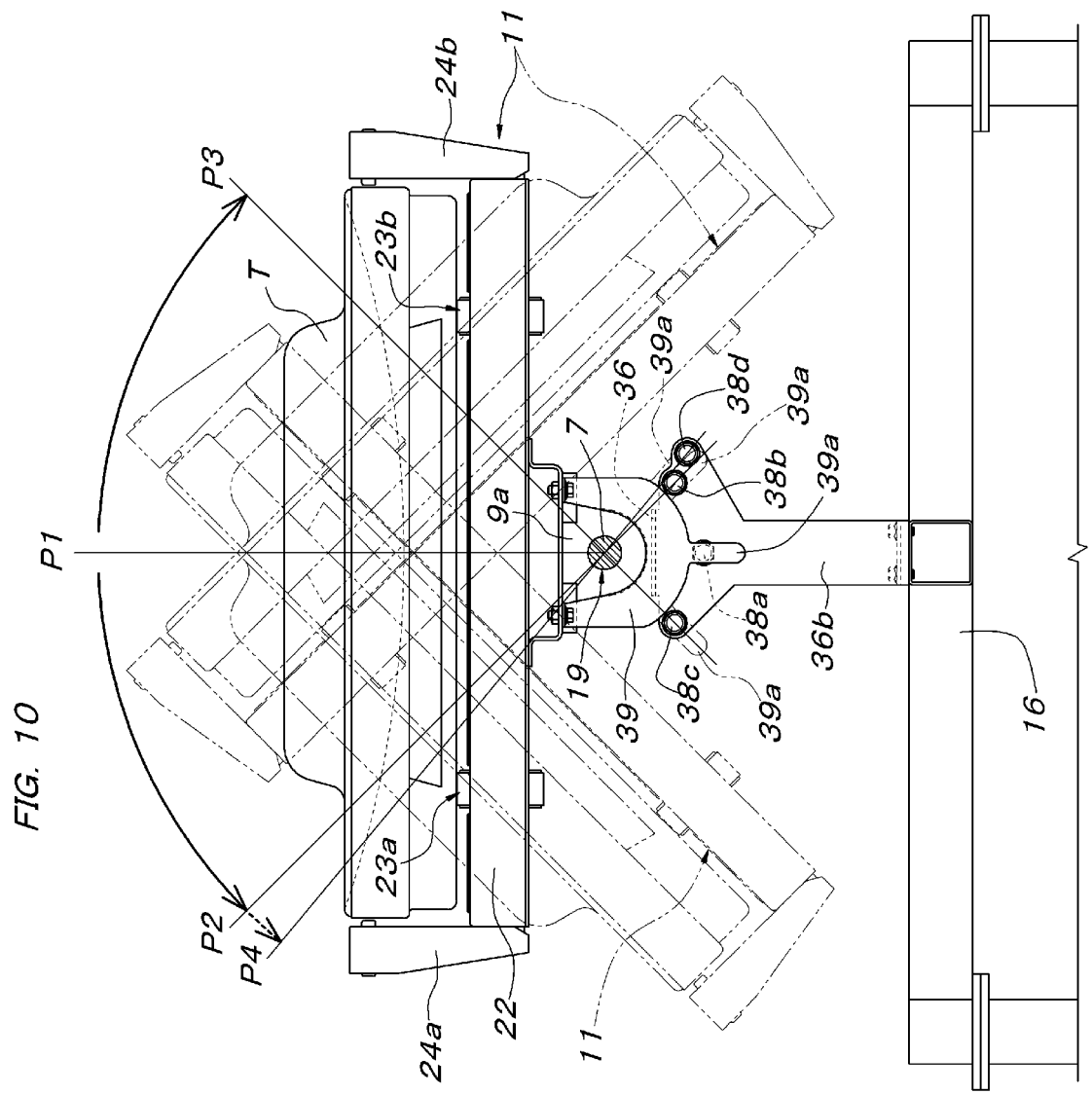

CONVEYING AND SORTING APPARATUS

FIELD OF THE INVENTION

The present invention relates to a conveying and sorting apparatus capable of sliding and sorting a conveyed object to a lateral direction by gravity at a sorting area set on a conveying path of the conveyed object.

BACKGROUND OF THE INVENTION

As the conveying and sorting apparatus as described above, as described in Patent Literature 1, there is known a conveyed object conveying and sorting apparatus including a plurality of tilting conveyor units arranged in a row in a conveying direction, each of the tilting conveyor units supported above a frame so as to be swingable left and right about a support shaft parallel to the conveying direction between a horizontal conveying orientation and a tilted orientation for discharging the conveyed object to the lateral direction with respect to the conveying direction by gravity.

In such a conveying and sorting apparatus, a tray of a fixed size on which the conveyed object is placed is used together when the size and the shape of the conveyed object are not constant. In sorting, only the conveyed object placed on the tray is slid on the tray and dropped to the lateral direction, and the tray is conveyed to the downstream side as it is. The sorting operation is performed by tilting the tilting conveyor units supporting and conveying the tray while the conveyance of the tray by each tilting conveyor unit is continued in order not to reduce the conveyance efficiency. When the conveying and sorting apparatus is used in this manner, in order to decrease the conveying pitch of the tray and increase the conveyance efficiency, the length in the conveying direction of each tilting conveyor unit is configured to be sufficiently shortened with respect to the length of the tray to support one tray by a plurality of tilting conveyor units, and the tilting conveyor units are controlled as follows. A tilting conveyor unit departing to the downstream side from a tilted filled tray supporting and conveying area in which the conveyed object is placed on the tray is immediately restored to the original horizontal orientation to be returned to a receiving posture (horizontal orientation) for a subsequent filled tray. After the sorting, tilting conveyor units on the upstream side of a tilted empty tray supporting and conveying area in which the emptied tray is supported and conveyed keeping the tilted orientation of sorting operation are switched to the tilted orientation sequentially from a tilting conveyor unit departing to the downstream side from a preceding empty tray supporting and conveying area and are connected to the tilted empty tray supporting and conveying area. At the point in time at which a tray conveying path length required by the time when the emptied tray in the tilted empty tray supporting and conveying area is restored to the horizontal orientation is secured on the upstream side of that tray, all of the tilting conveyor units within the tilted empty tray supporting and conveying area are restored to the horizontal orientation all at once.

CITATION LIST

Patent Literature

Patent Literature 1: Japanese Translation of International Application (Kohyo) No. 2015-501770

SUMMARY OF THE INVENTION

Technical Problem

When the tilting conveyor units are controlled as described above, the switching of the tilting conveyor units from the tilted orientation to the horizontal orientation and the switching of the tilting conveyor units from the horizontal orientation to the tilted orientation need to be performed in consideration of the conveying speed of the tray in the sorting area at a timing at which the filled tray or the empty tray is not located in such a manner that the filled tray or the empty tray straddle between the tilting conveyor unit to be switched in orientation and the tilting conveyor unit not to be switched in orientation adjacent thereto. Therefore, the current position of the tray in the sorting area composed of a plurality of tilting conveyor units arranged in a row in the conveying direction needs to be checked accurately. As a means for this, a configuration is generally conceived in which the position of the tray conveyed in the sorting area is detected by various sensors. However, in reality, a configuration suitable as a position detecting means of the tray in the course of conveyance in the conveying and sorting apparatus having the configuration as described above has not been disclosed in the art.

The present invention proposes a conveying and sorting apparatus suitable for solving the problem as described above. Described by giving reference signs in parentheses used in the description of an embodiment described below in order to facilitate understanding the relationship with the embodiment, the conveying and sorting apparatus according to the present invention is a conveying and sorting apparatus including a plurality of tilting conveyor units (10, 11) arranged in a row in a conveying direction, each of the tilting conveyor units (10, 11) supported above a frame (16) so as to be swingable left and right about a support shaft (7) parallel to the conveying direction between a horizontal conveying orientation and a tilted orientation for discharging a conveyed object to a lateral direction with respect to the conveying direction by gravity, in which a reflective photoelectric sensor (32, 33) detecting a conveyed object (a tray T) passing between the tilting conveyor units (10, 11) adjacent to each other in the conveying direction via a light beam vertically passing through a gap between the tilting conveyor units (10, 11) is arranged, and the photoelectric sensor (32, 33) is attached to a support member (34, 35) supported by a frame (16) and arranged at a position around the support shaft (7).

Effect of Invention

According to the configuration of the present invention described above, the position of the conveyed object (for example, the tray) conveyed within the sorting area including a plurality of tilting conveyor units can be detected from, among the photoelectric sensors corresponding to respective gaps between the tilting conveyor units adjacent to one another, a photoelectric sensor which is in a conveyed object detection ON state. That is, if the length (the width in the conveying direction) of one tilting conveyor unit is configured to be shorter than the length of the conveyed object so that one or more photoelectric sensors are always in the conveyed object detection ON state, a front end of the conveyed object is located within from a position of the photoelectric sensor, among the photoelectric sensors in the conveyed object detection ON state, at the front end in the conveying direction to the width in the conveying direction of the tilting conveyor unit adjacent on the forward side of the position of the photoelectric sensor, and a rear end of the conveyed object is located within from a position of the photoelectric sensor, among the photoelectric sensors in the conveyed object detection ON state, at the rear end in the conveying direction to the width in the conveying direction of the tilting conveyor unit adjacent on the rearward side of the position of the photoelectric sensor. Thus, for the orientation switching of the tilting conveyor unit on the rearward side with respect to the conveyed object, at the point in time at which the photoelectric sensor, among the photoelectric sensors in the conveyed object detection ON state, at the rear end in the conveying direction is switched from ON to OFF, the tilting conveyor unit adjacent rearward in the conveying direction from the position of the photoelectric sensor can be immediately switched in orientation. For the orientation switching of the tilting conveyor unit on the forward side with respect to the conveyed object, the orientation of a plurality of tilting conveyor units set in consideration of the conveying speed of the conveyed object, on the forward side of the position of the photoelectric sensor, among the photoelectric sensors in the conveyed object detection ON state, at the front end in the conveying direction can be controlled so as to keep the same orientation as that of the tilting conveyor units supporting and conveying the conveyed object.

As described above, the position of the conveyed object within the sorting area is detected from ON/OFF states of the photoelectric sensors provided corresponding to the gaps between the tilting conveyor units adjacent to one another in the conveying direction, and the orientation switching control of each tilting conveyor unit can be performed. In the configuration of the present invention, the photoelectric sensor is a reflective photoelectric sensor which detects the conveyed object passing between the tilting conveyor units adjacent to each other in the conveying direction via a visible light or infrared ray vertically passing through the gap between the tilting conveyor units and also is a photoelectric sensor arranged at a position around the support shaft that is the tilt center of the tilting conveyor unit. Thus, the conveyed object on the tilting conveyor units can be detected from the nearest position with respect to that conveyed object regardless of whether the orientation of the tilting conveyor units is in the horizontal orientation or the tilted orientation. Moreover, at the time of detection of the conveyed object, there is no need to compare the detection results of the surface of the conveyed object with the detection results of an object other than the conveyed object, for example, the surface of the tilting conveyor unit, to determine whether or not the conveyed object is detected. Thus, the detection of the conveyed object in the sorting area can be performed remarkably accurately and reliably.

That is, since the photoelectric sensor is the reflective photoelectric sensor, a projected light beam is reflected by a bottom surface of the conveyed object and the reflected light beam is received, and then the photoelectric sensor enters the conveyed object detection ON state. Since the bottom surface of the conveyed object passing between the tilting conveyor units in the horizontal orientation is in a horizontal state and the bottom surface of the conveyed object passing between the tilting conveyor units in the tilted orientation is tilted, it needs to be configured in either case such that the light beam projected from the photoelectric sensor at a fixed position and reflected and returned from the bottom surface of the conveyed object is received by the photoelectric sensor at the fixed position. In such a case, the configuration of the present invention in which the distance between the photoelectric sensor and the bottom surface of the conveyed object is shortened as described above is very advantageous and can be carried out simply and easily by using photoelectric sensors generally available in the market without arranging two photoelectric sensors, that is, one for detecting the conveyed object passing between the tilting conveyor units in the horizontal orientation and one for detecting the conveyed object passing between the tilting conveyor units in the tilted orientation, and also without using a particular photoelectric sensor in which the reception area of the reflected light beam is specially widened.

When the above present invention is carried out, the support member (34) can be composed of a portal plate material (34a) straddling the support shaft (7), and the portal plate material (34a) can have both leg portions attached on a support base (36) installed on the frame (16) so as to be located below the support shaft (7). According to the configuration, the photoelectric sensor can be attached at any place around the support shaft, and further, a sufficient strength can be given also to the support member composed of the portal plate material. When the support shaft (7) has a connection portion connected by a shaft joint (18) at a position between the tilting conveyor units (10, 11) adjacent to each other in the conveying direction, the connection portion can be provided with a pair of bearings (5, 6) supporting end portions of each support shaft (7) at both sides of the shaft joint (18) and a bearing support base (17a) installed above the frame (16) and supporting the pair of bearings (5, 6). Thus, the photoelectric sensor (32, 33) arranged at the position between the tilting conveyor units (10, 11) where the connection portion is located can be attached to the support member (35) composed of a portal plate material (35a) straddling the shaft joint (18), and the portal plate material (35a) can have both leg portions attached on the bearing support base (17a).

When the photoelectric sensor (32, 33) is arranged higher than the support shaft (7) in side view, the distance between the photoelectric sensor and the bottom surface of the conveyed object to be detected can be further shortened. The photoelectric sensor (32, 33) can be attached such that a projection direction of its light beam is tilted on a tilting direction side toward the tilted orientation of the tilting conveyor unit (10, 11) with respect to a vertical direction. In this case, the tilt angle of the projection direction is set to an angle capable of detecting both a conveyed object transferring between the tilting conveyor units (10, 11) when the tilting conveyor units (10, 11) are in the horizontal orientation and a conveyed object transferring between the tilting conveyor units (10, 11) when the tilting conveyor units (10, 11) are in the tilted orientation. Specifically, for example, when the tilting conveyor unit is tilted, for example, 45 degrees in the left (or right) direction with respect to the vertical line passing through the axial center of the support shaft, if the light beam projection direction of the photoelectric sensor is configured to be tilted in the same direction by 22.5 degrees, a half of the tilt angle of the tilting conveyor unit, the reflected light beam can be received by the photoelectric sensor at the fixed position, for example, at the right end side of a light beam reflection area from the horizontal bottom surface of the conveyed object when the tilting conveyor unit is in the horizontal orientation, and the reflected light beam can be received by the photoelectric sensor at the fixed position, for example, at the left end side of the light beam reflection area from the tilted bottom surface of the conveyed object when the tilting conveyor unit is in the tilted orientation. That is, by utilizing the entire area of the light beam reflection area from the bottom surface of the conveyed object, the conveyed object passing between the tilting conveyor units can be reliably detected by the photoelectric sensor at the fixed position when the tilting conveyor unit is in any of the horizontal orientation and the tilted orientation.

When the tilting conveyor unit is configured to be tiltable to both the left and right sides in order that the conveyed object can be sorted to both the left and right sides of the sorting area, the photoelectric sensor corresponding to the tilted orientation to the left side and the photoelectric sensor corresponding to the tilted orientation to the right side can be juxtaposed in a left-right distributed manner with respect to the support shaft.

BRIEF DESCRIPTION OF THE DRAWINGS

FIG. 10 is a rear view of a main part illustrating an orientation detecting means of the tilting conveyor unit.

DETAILED DESCRIPTION OF THE INVENTION

Figure 1A:
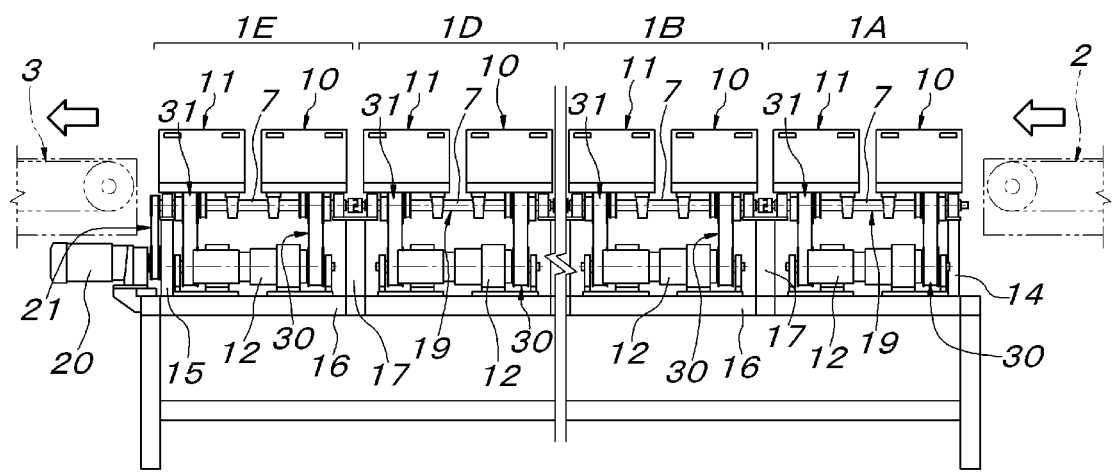
FIG. 1A is a partially omitted side view of a conveying and sorting apparatus.
Figure 1B:
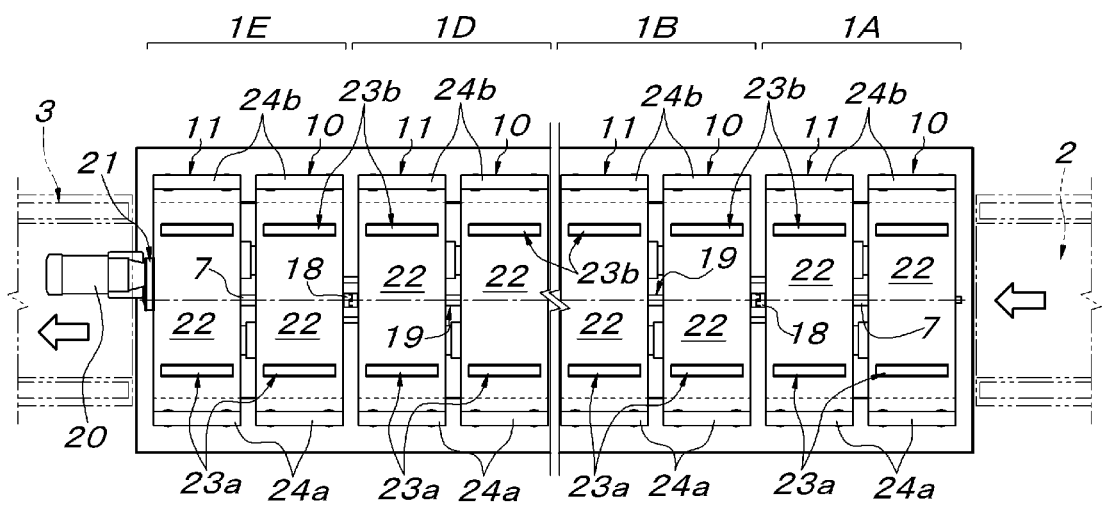
FIG. 1B is a plan view of the same.

As shown in FIG. 1A and FIG. 1B, a conveying and sorting apparatus illustrated in this embodiment is arranged in one sorting area set on a conveying path for conveying a tray loaded with a conveyed object and is composed of five assemblies 1A to 1E. A carry-in conveyor 2 is connected to an assembly 1A at an entrance side end portion, and a carry-out conveyor 3 is connected to an assembly 1E at an exit side end portion. In the drawings, an illustration of a central assembly 1C is omitted.

Each assembly 1A to 1E has the same structure. Described based on FIG. 2 to FIG. 6, each assembly 1A to 1E is composed of a support shaft 7 having both ends rotatably supported by a pair of bearings 5, 6 in the conveying direction of the conveyed object, being parallel to the conveying direction of the conveying and sorting apparatus, and horizontally located at a central position in a left-right width direction of the conveying and sorting apparatus, a pair of front and rear tilting conveyor units 10, 11 supported by a pair of front and rear bearings 8a, 8b and 9a, 9b on this support shaft 7, respectively, and two tilting motors 12, 13 individually switching the tilting conveyor units 10, 11 between a horizontal conveying orientation and a tilted orientation. The bearings 5, 6 located at both ends in the conveying direction of the conveying and sorting apparatus among the pair of front and rear bearings 5, 6 of each assembly 1A to 1E are each supported above a frame 16 by one columnar support member 14, 15. Two adjacent bearings 5, 6 between two adjacent assemblies are supported on a common columnar support member 17 via one bearing support base 17a and above the frame 16.

Between the two adjacent assemblies of the assemblies 1A to 1E, end portions of the support shafts 7 are concentrically interlockingly coupled to each other by a shaft joint 18, and a single interlocking transmission shaft 19 continuing over the overall length of the conveying and sorting apparatus is formed. At a free end of the support shaft 7 of the assembly 1E located at the exit side end portion of the conveying and sorting apparatus, one conveyor driving motor 20 supported by the frame 16 outside the assembly 1E is interlockingly coupled by a vertical winding transmission means 21.

Each tilting conveyor unit 10, 11 has the same structure and is composed of a structure 22 being horizontally long rectangular in plan view, a pair of left and right belt conveyors 23a, 23b for conveying the conveyed object provided to the structure 22, and side guides 24a, 24b attached along both left and right ends of the structure 22. Each belt conveyor 23a, 23b includes drive shafts 25a, 25b at its front end side arranged in series concentrically with each other in a left-right lateral direction. The both drive shafts 25a, 25b are interlockingly coupled to a common drive shaft 27 extending rearward from one transmission gear box 26 installed on the structure 22. The common drive shaft 27 is interlockingly coupled to the support shaft 7 via a winding transmission means 28.

With the above configuration, by operating the one conveyor driving motor 20 installed at the exit side of the conveying and sorting apparatus, the pairs of left and right belt conveyors 23a, 23b provided to the pairs of front and rear tilting conveyor units 10, 11 of all of the assemblies 1A to 1E can be rotationally driven via the winding transmission means 28 and the gear boxes 26 from the interlocking transmission shaft 19 (the support shaft 7 of each assembly 1A to 1E) such that the tray T supported on the belt conveyors 23a, 23b is conveyed from the entrance side to the exit side of the conveying and sorting apparatus at a predetermined speed. In the tray T at this time, the conveying path is regulated at both left and right sides of the tray T by the side guides 24a, 24b erected on both left and right sides of each tilting conveyor unit 10, 11. A pair of front and rear guide rollers 29 abutting and rolling on both left and right side surfaces of the tray T are pivotally supported at the side guides 24a, 24b.

Figure 3:
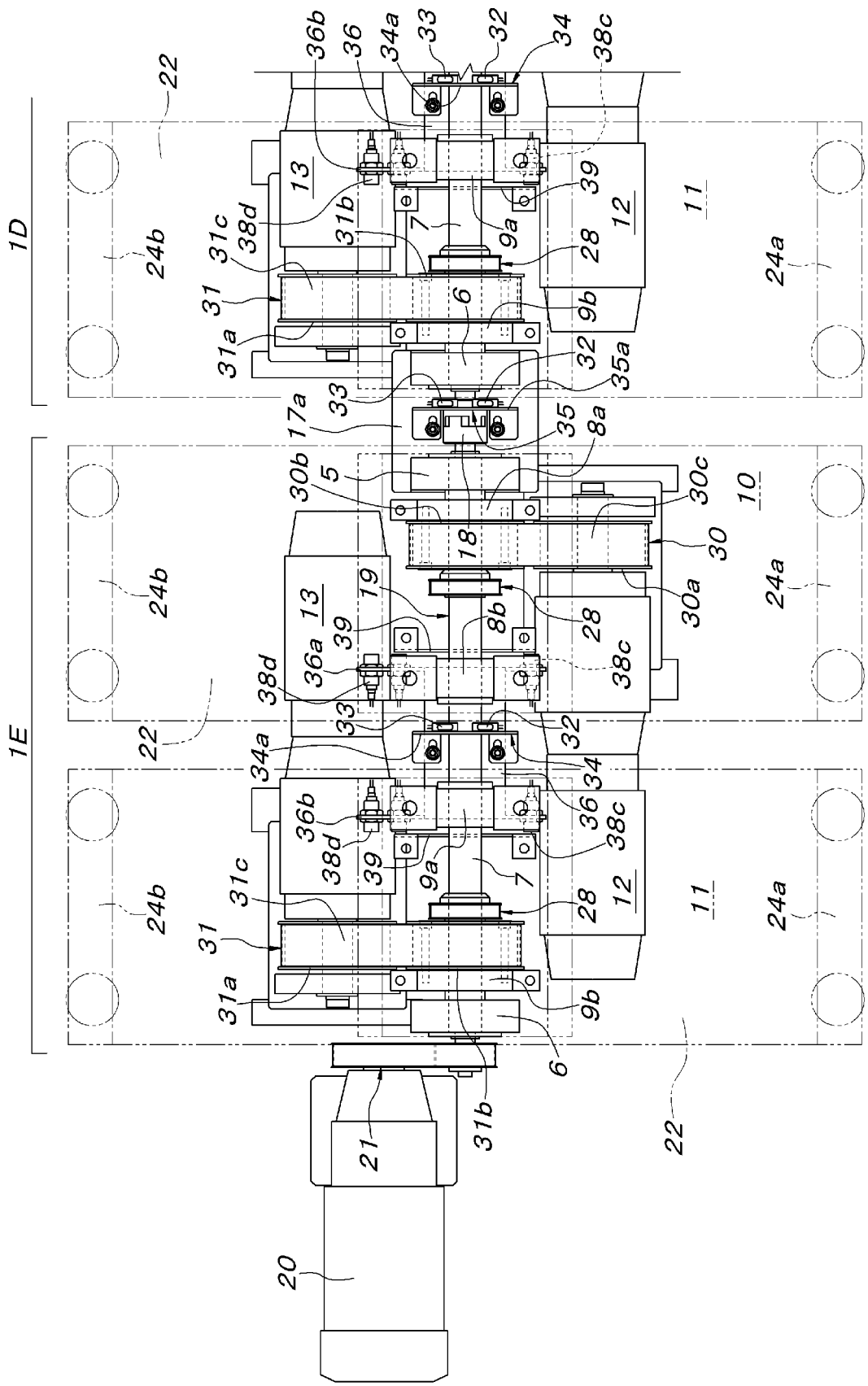
FIG. 3 is a plan view showing a state where each tilting conveyor unit in FIG. 2 is removed.
Figure 4:
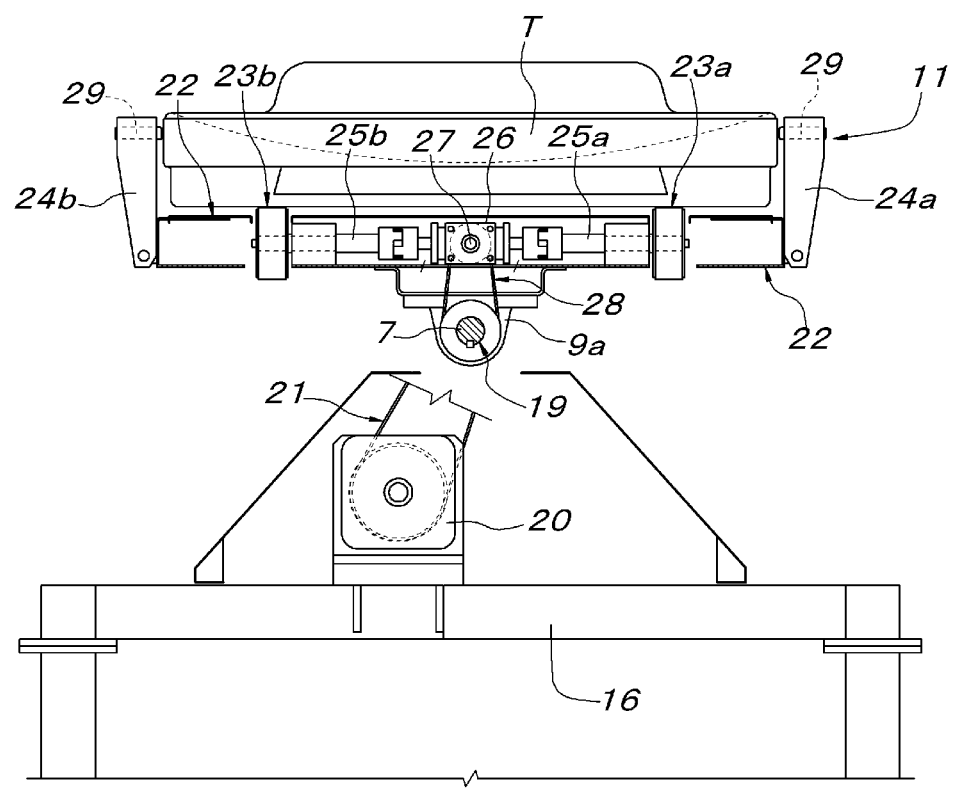
FIG. 4 is a longitudinal sectional front view (a view seen from the downstream side of the conveying direction) of a main part showing a drive system of a pair of left and right belt conveyors provided to the tilting conveyor unit.

The pair of front and rear tilting conveyor units 10, 11 provided to the assemblies 1A to 1E are supported by the interlocking transmission shaft 19 (the support shaft 7 of each assembly 1A to 1E) via the pair of front and rear bearings 8a to 9b, respectively, so as to be tiltable in a direction along which both left and right end portions vertically move. In order to switch the tilting conveyor unit 10, 11 between the horizontal conveying orientation (see FIG. 4 and FIG. 5) supporting and conveying the tray T and the tilted orientation tilted about the support shaft 7, for example, about 45 degrees, in one of the left and right directions as shown in FIG. 6, the tilting motor 12, 13 is interlockingly coupled for every tilting conveyor unit 10, 11. As shown in FIG. 3, the both tilting motors 12, 13 are installed on the frame 16 so that the front and rear are reverse to each other at both left and right sides of the support shaft 7 in plan view and so that respective axial center directions become parallel to the support shaft 7.

More specifically, a winding transmission means 30, 31 using a timing belt is interposed between each tilting motor 12, 13 and the tilting conveyor unit 10, 11. The winding transmission means 30, 31 is formed by stretching a timing belt 30c, 31c between a transmission side timing belt pulley 30a, 31a attached to an output shaft of each tilting motor 12, 13 and a driven side timing belt pulley 30b, 31b loosely fitted to the support shaft 7 so as to be relatively rotatable. The driven side timing belt pulley 30b, 31b is fixed and integrated to the bearing 8a, 9b located outside, among the pairs of front and rear bearings 8a to 9b tiltably supporting the tilting conveyor units 10, 11 to the support shaft 7. The rotation of the driven side timing belt pulley 30b, 31b is directly transmitted to the tilting conveyor unit 10, 11 (the structure 22), and the tilting conveyor unit 10, 11 is configured to be tilted about the support shaft 7.

An example of a method of using the conveying and sorting apparatus configured as above will be described. As described above, the pairs of left and right belt conveyors 23a, 23b of the pair of front and rear tilting conveyor units 10, 11 provided to each assembly 1A to 1E are, by operating the one conveyor driving motor 20, enter an operating state of rotating in the same direction at a predetermined speed.

Figure 5:
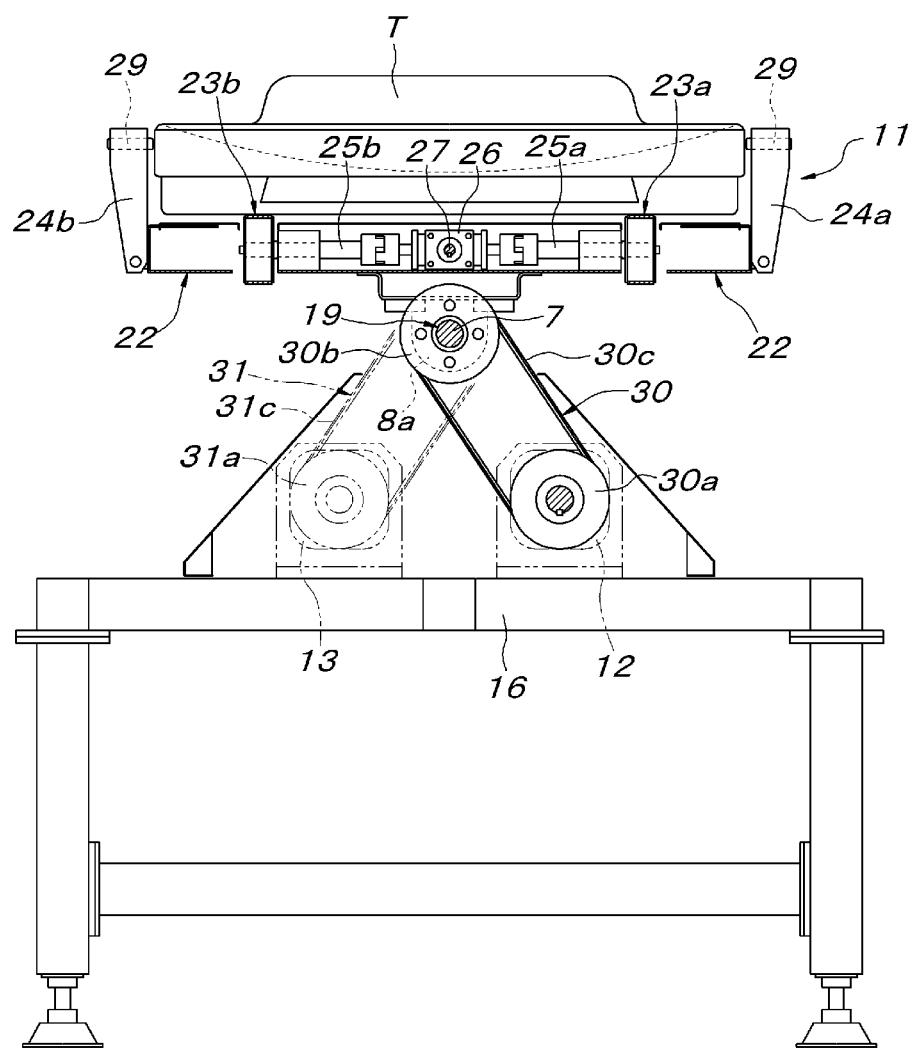
FIG. 5 is a longitudinal sectional front view of a main part showing a drive system for tilting the tilting conveyor unit.
Figure 6:
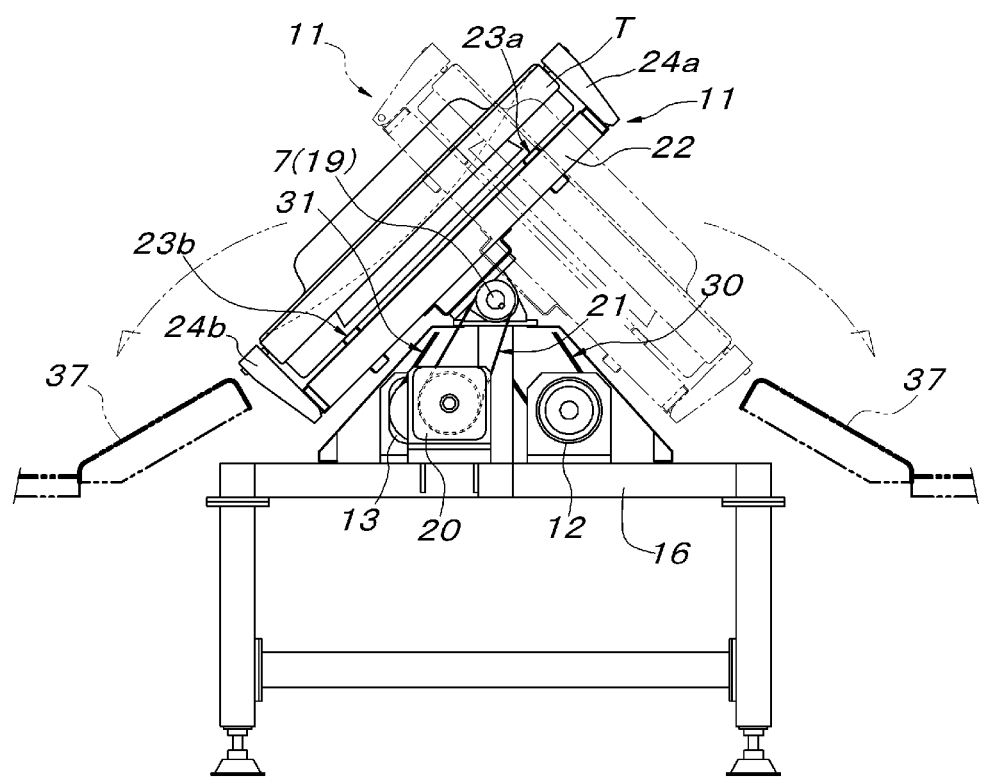
FIG. 6 is a front view illustrating a state at the time of sorting operation of the conveying and sorting apparatus.

On the other hand, the tilting motors 12, 13 are stopped with the tilting conveyor units 10, 11 of all of the assemblies 1A to 1E being in the horizontal conveying orientation as shown in FIG. 5, so that the tilting conveyor units 10, 11 are held in the horizontal conveying orientation by the function of the tilting motors 12, 13 and do not swing about the support shaft 7/the interlocking transmission shaft 19 by gravity. Accordingly, with the tilting conveyor units 10, 11 of all of the assemblies 1A to 1E held in the horizontal conveying orientation, the conveyor driving motor 20 is operated as above to interlockingly rotationally drive the belt conveyors 23a, 23b in a predetermined conveying direction, and then the tray T loaded with the conveyed object sent in from the carry-in conveyor 2 shown in FIG. 1A and FIG. 1B can be conveyed toward the carry-out conveyor 3 at a constant speed and sent out onto the carry-out conveyor 3.

Figure 7:
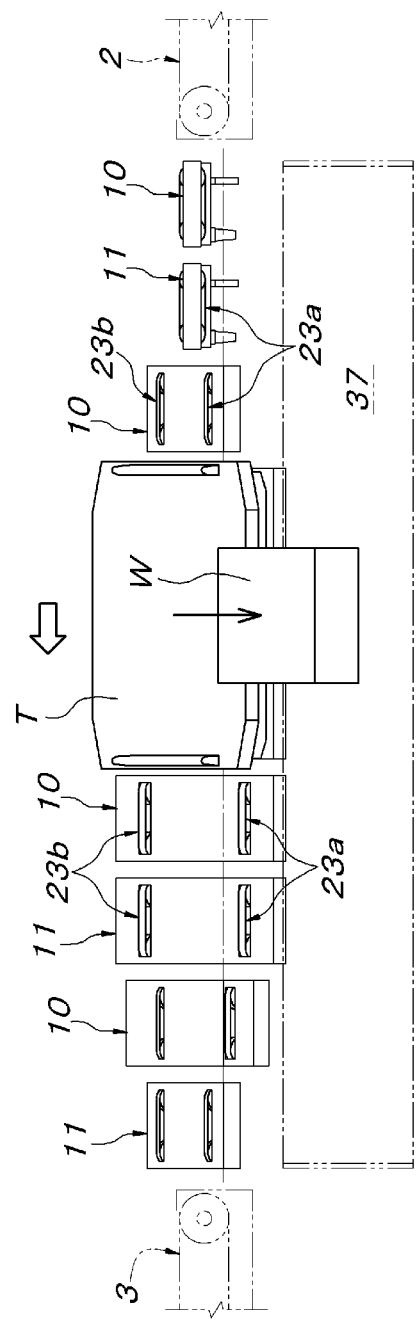
FIG. 7 is a schematic side view illustrating a state at the time of sorting operation to the left side of the conveying and sorting apparatus.

When a specific tilting conveyor unit 10, 11 is switched from the horizontal conveying orientation to the tilted orientation for sorting in a tray conveying state in which the belt conveyors 23a, 23b of the tilting conveyor units 10, 11 of all of the assemblies 1A to 1E are operated as above, the tilting motor 12/13 of the tilting conveyor unit 10/11 to be switched to the tilted orientation is operated. Thereby, the target tilting conveyor unit 10/11 can be tilted about the support shaft 7 (the interlocking transmission shaft 19) in a predetermined direction via the winding transmission means 30/31. When the tilting conveyor unit 10/11 in the tilted orientation is returned to the original horizontal conveying orientation, the tilting motor 12/13 of the tilting conveyor unit 10/11 is reversely rotated by the rotation angle at the time of tilting operation, and the tilting conveyor unit 10/11 can be returned from the tilted orientation to the original horizontal conveying orientation.

Where the conveyed object loaded on the tray T sent in from the carry-in conveyor 2 is the target to be sorted in a certain sorting area of the conveying and sorting apparatus, as shown in FIG. 7, when the tray T travels a certain distance from the carry-in conveyor 2 and enters a state in which the entirety of the tray is supported by a plurality of tilting conveyor units 10, 11, a plurality of tilting conveyor units located in an area supporting the tray T are swung to the sorting side from the horizontal orientation to be switched to the tilted orientation, and the traveling tray T, which the tilting conveyor units support, is tilted to the sorting side by a required angle. As a result, the conveyed object W on the tray T slides on the tray T toward the lower side of the tilt by gravity and then slips off from on top of the tray T. Generally, a chute 37 taking over the conveyed object W slipping off from on top of the tray T in the tilted orientation and guiding the object onto a target handling table is juxtaposed. After the sorting is completed, the plurality of tilting conveyor units in the area supporting the tray T are switched from the tilted orientation to the horizontal orientation, and each tilting conveyor unit 10, 11 is controlled so that the tray T reaches on the tilting conveyor units 10, 11 of the assembly 1E at the terminal end in the horizontal orientation. Thereby, the empty tray T after the sorting can be sent out onto the downstream carry-out conveyor 3 from the conveying and sorting apparatus.

Even during the switching of the tilting conveyor units 10, 11 from the horizontal orientation to the tilted orientation for the above-described sorting operation and during the switching of the tilting conveyor units 10, 11 from the tilted orientation to the horizontal orientation after the sorting completion, the conveyance of the tray T is continued by the belt conveyors 23a, 23b provided to each tilting conveyor unit 10/11. Thus, so as not to support the tray T while straddling between the tilting conveyor units 10, 11 different in orientation, the orientation control of each tilting conveyor unit 10, 11 is performed according to the tray conveying speed of the tilting conveyor units 10, 11 so that only the required number of tilting conveyor units 10, 11 having the same orientation as the tilting conveyor units 10, 11 supporting and conveying the tray T at that time are always present on the forward side of the tray T. The orientation switching control of the tilting conveyor units 10, 11 is performed based on the current position of the tray T conveyed by the tilting conveyor units 10, 11 of the conveying and sorting apparatus. A configuration for detecting the current position of the tray T will be described next.

Figure 2:
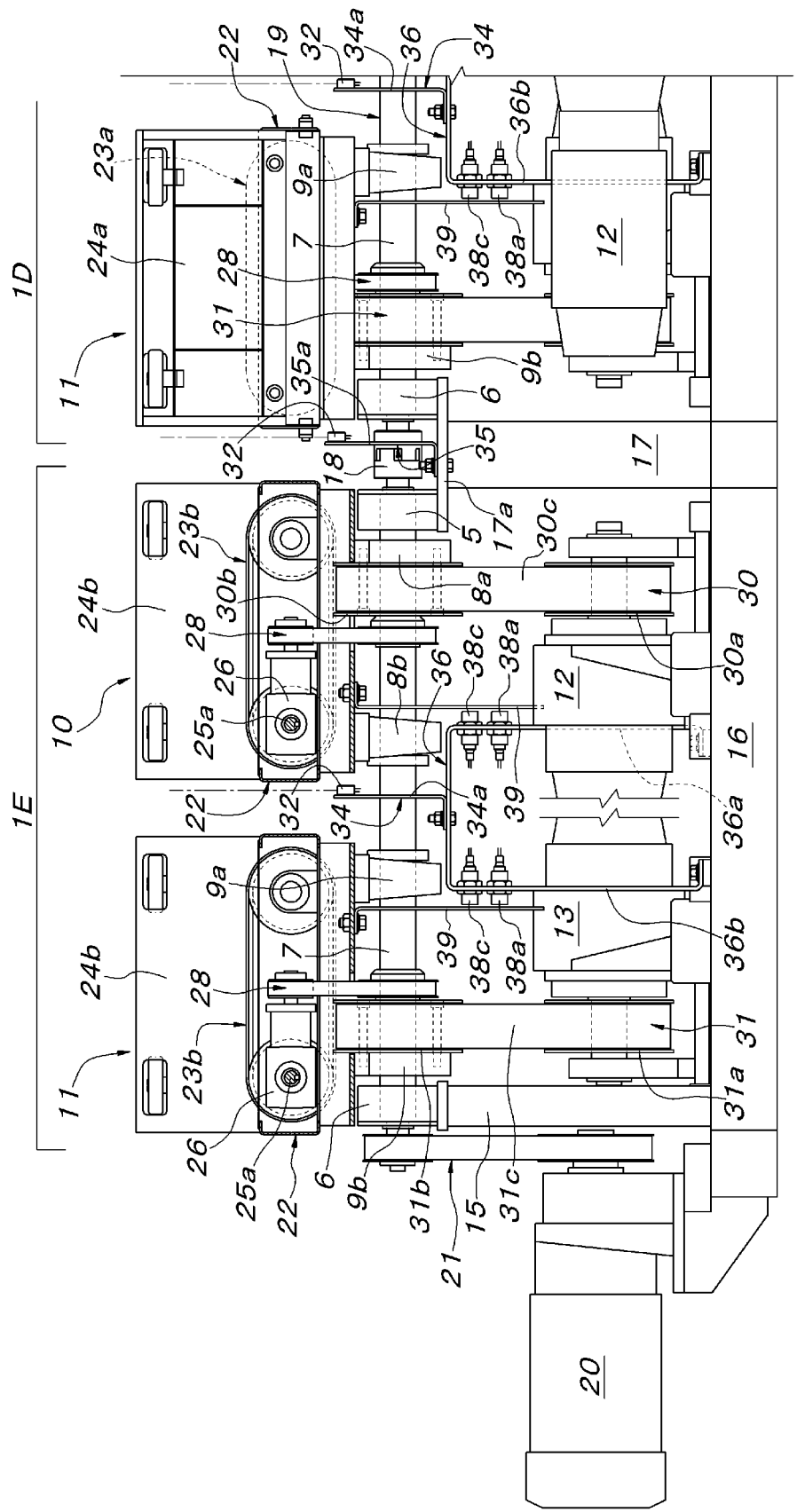
FIG. 2 is a side view of a main part showing an exit side area of the conveying and sorting apparatus.
Figure 8:
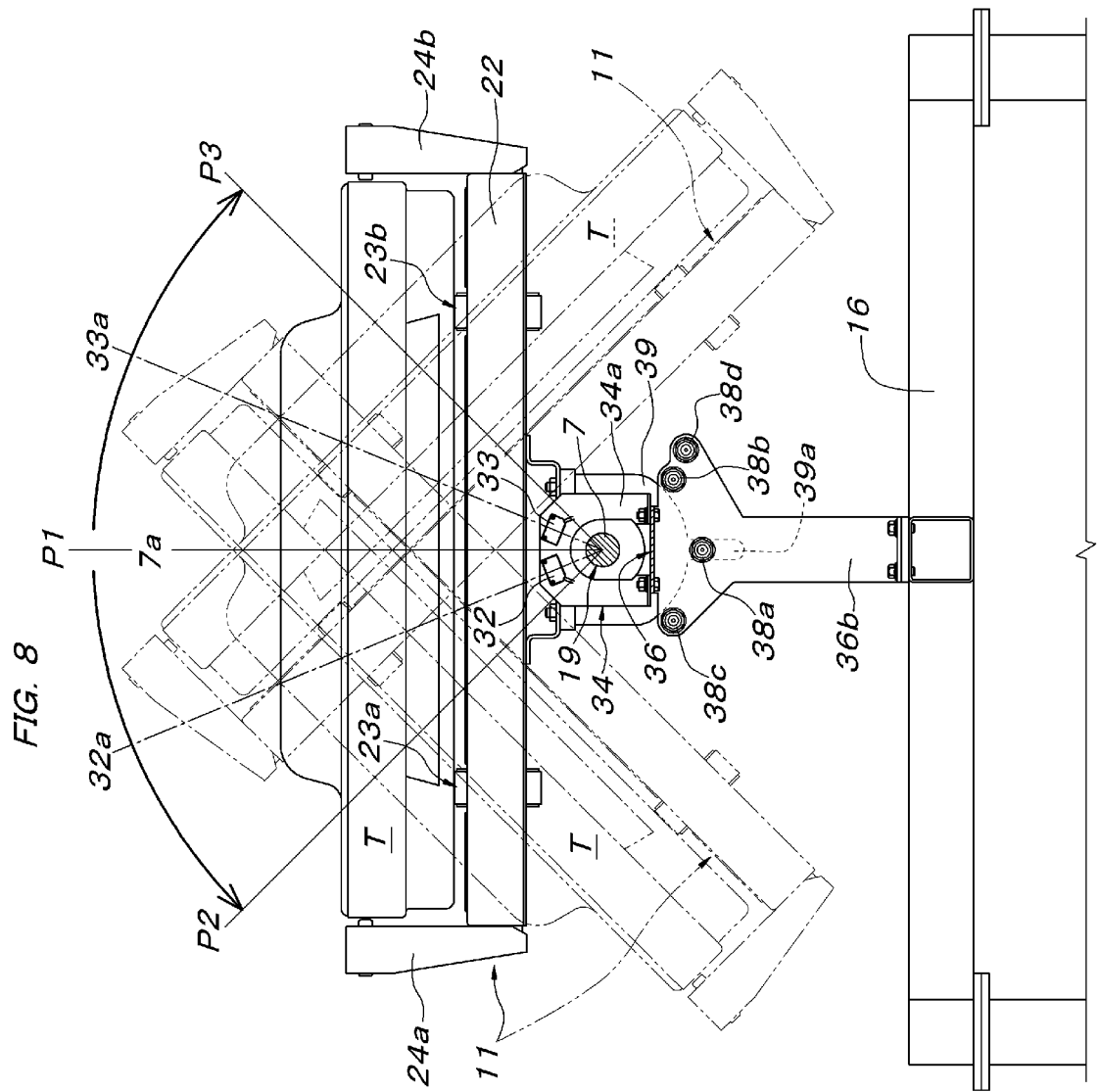
FIG. 8 is a rear view (a view seen from the upstream side of the conveying direction) of a main part illustrating a current position detecting means of a tray for loading a conveyed object.

As shown in FIG. 2, FIG. 3, and FIG. 8, a pair of left and right photoelectric sensors 32, 33 are arranged between the tilting conveyor units 10, 11 adjacent to each other in the front-rear direction via support members 34, 35. Of the support members 34, 35, the support member 34 arranged between the pair of front and rear tilting conveyor units 10, 11 of each assembly 1A to 1E is attached on a support base 36 having a portal shape in side view mounted on the frame 16, at an intermediate position between the pair of left and right tilting motors 12, 13 provided to each assembly 1A to 1E and below the support shaft 7. The support members 35 located between adjacent assemblies 1A, 1B, between adjacent assemblies 1B, 1C, between adjacent assemblies 1C, 1D, and between adjacent assemblies 1D, 1E, are each attached on the bearing support base 17a supporting the bearings 6, 5 at both front and rear sides of the shaft joint 18 located in the same position.

The support member 34 is composed of a portal plate material 34a straddling the support shaft 7, and has both leg portions whose lower ends are attached on the support base 36. The support member 35 is composed of a portal plate material 35a straddling the shaft joint 18, and has both leg portions whose lower ends are attached on the bearing support base 17a. As shown in FIG. 2, the support members 34, 35 are provided at positions closer to the tilting conveyor units 10, 11 located on the upstream side than a central position in the width direction of a gap between the tilting conveyor units 10, 11 at both front and rear sides of the support members 34, 35. The photoelectric sensors 32, 33 are attached on side surfaces on the upstream side of the support members 34, 35. Thus, it is configured such that the tray T entered into the gap between the both front and rear tilting conveyor units 10, 11 from the upstream side can be detected promptly.

Figure 9A:
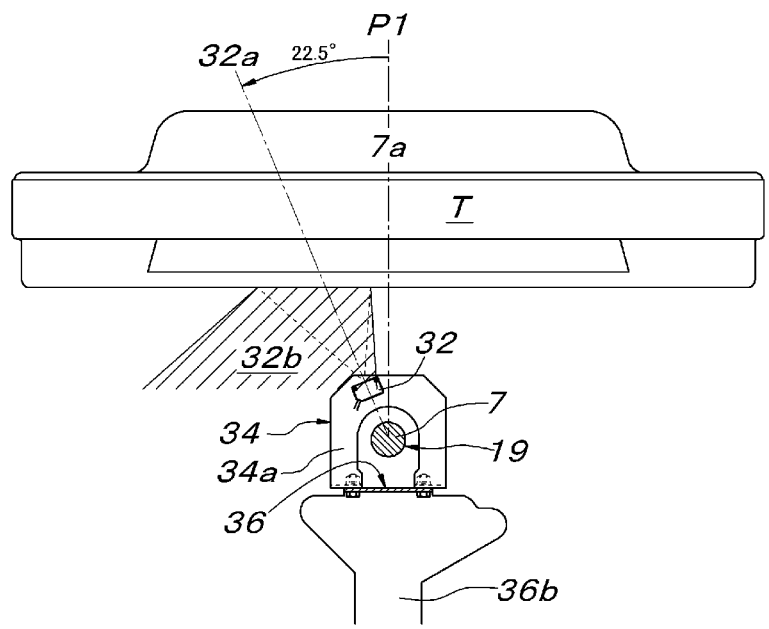
FIG. 9A is a rear view of a main part illustrating a detection operation state of a photoelectric sensor at the time when the tilting conveyor unit is in a horizontal orientation.
Figure 9B:
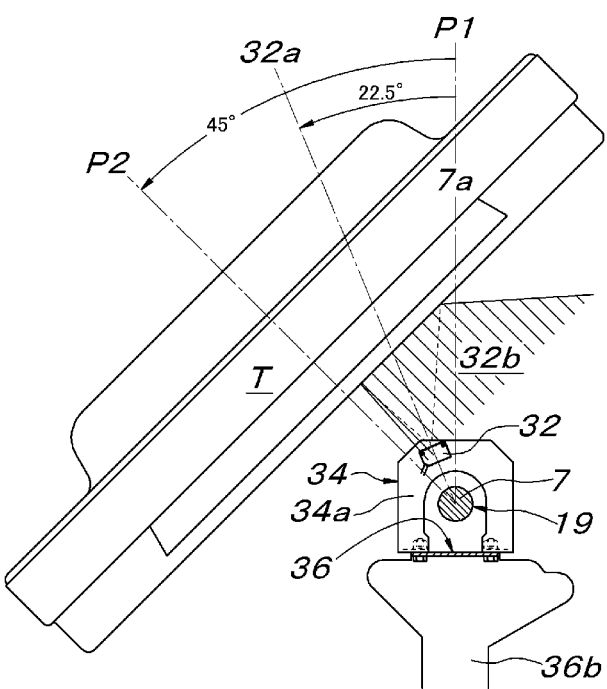
FIG. 9B is a rear view of a main part illustrating a detection operation state of the photoelectric sensor at the time when the tilting conveyor unit is in a tilted orientation.

The photoelectric sensor 32, 33 is of a light projecting/receiving portion integrated type. When a light beam projected from the light projecting portion is reflected by the bottom surface of the tray T passing through the gap between the tilting conveyor units 10, 11, the receiving portion receives the reflected light beam, and then the photoelectric sensor 32, 33 enters the conveyed object detection ON state. As shown in FIG. 2, the photoelectric sensor 32, 33 is attached to the support member 34, 35 at a position higher than the support shaft 7 in side view. As shown in FIG. 9, the left photoelectric sensor 32 is attached so that an optical axis 32a in a light beam projection direction thereof is tilted by 22.5° to the left side with respect to a vertical line 7a passing through the axial center of the support shaft 7 in front view. The tilt angle 22.5° of the optical axis 32a is a half of a tilting angle 45° of the tilting conveyor unit 10, 11 toward a left side tilted orientation P2. As shown in FIG. 8, the right photoelectric sensor 33 is attached so as to be bilaterally symmetrical with the left photoelectric sensor 32 so that an optical axis 33a thereof is tilted by 22.5° to the right side with respect to the vertical line 7a in front view.

The tilt angle in the light beam projection direction of the photoelectric sensor 32, 33 can be set as follows. That is, by describing the left photoelectric sensor 32 as an example, the tilt angle in the light beam projection direction of the photoelectric sensor 32, 33 is set according to the tilt angle of the tilting conveyor unit 10, 11 (the tray T), a spread angle of the light beam reflection area from the photoelectric sensor 32, 33, and a distance between a surface to be detected (the bottom surface of the tray T) and the photoelectric sensor 32, 33, etc., such that, as shown in FIG. 9A, when the tilting conveyor units 10, 11 are in a horizontal orientation P1, the light beam projected diagonally left upward from the light projecting portion of the photoelectric sensor 32 is reflected diagonally left downward by the horizontal bottom surface of the tray T, and the receiving portion of the photoelectric sensor 32 is located at a position near the right end of a light beam reflection area 32b, and the reflected light beam can be received, and when the tilting conveyor units 10, 11 are in the tilted orientation P2 to the left side, the light beam projected diagonally left upward from the light projecting portion of the photoelectric sensor 32 is reflected diagonally right downward by the tilted bottom surface of the tray T, and the receiving portion of the photoelectric sensor 32 is located at a position near the left end of the light beam reflection area 32b, and the reflected light beam can be received.

As a matter of course, since the photoelectric sensor 32 is a sensor that detects the tray T passing between the tilting conveyor units 10, 11 when the tilting conveyor units 10, 11 are in either the horizontal orientation P1 or the left tilted orientation P2, or an intermediate orientation therebetween, and the photoelectric sensor 33 is a sensor that detects the tray T passing between the tilting conveyor units 10, 11 when the tilting conveyor units 10, 11 are in either the horizontal orientation P1 or a right tilted orientation P3, or an intermediate orientation therebetween, the photoelectric sensor, of the photoelectric sensors 32, 33, on a side different from the sorting direction can be omitted when the sorting direction of the conveyed object on the tray T is only either one of the left and right. Although the photoelectric sensor 32, 33 of the light projecting/receiving portion integrated type is illustrated, a photoelectric sensor of a light projecting/receiving portion separated type in which the light projecting portion and the light receiving portion are separated and respective installation positions can be changed can also be used. In addition, it can also be configured such that a main photoelectric sensor detecting the conveyed object passing between the tilting conveyor units 10, 11 when the tilting conveyor units 10, 11 are in the horizontal orientation and a secondary photoelectric sensor detecting the conveyed object passing between the tilting conveyor units 10, 11 when the tilting conveyor units 10, 11 are in the tilted orientation are provided and the conveyed object can be detected by at least one of the main photoelectric sensor and the secondary photoelectric sensor when the tilting conveyor units 10, 11 are tilted between the horizontal orientation and the tilted orientation.

When the photoelectric sensors 32, 33 are provided as described above, a situation can be determined that the front end of the tray T moves on the tilting conveyor unit 10/11 adjacent to the forward side of the positions of the photoelectric sensors 32, 33, among a plurality of photoelectric sensors 32, 33 in the conveying direction in the conveyed object detection ON state, at the front end in the conveying direction, and the rear end of the tray T moves on the tilting conveyor unit 10/11 adjacent to the rearward side of the positions of the photoelectric sensors 32, 33 at the rear end in the conveying direction in the conveyed object detection ON state. Thus, by performing the orientation control of the tilting conveyor units 10, 11 described above based on the determination results, the operation in which the conveyed object on the tray T in the horizontal orientation sent in from the carry-in conveyor 2 is sorted by tilting the tray T in a predetermined direction, and the returning of the empty tray T after the sorting to the horizontal orientation and the sending out of the tray T toward the carry-out conveyor 3 are allowed.

When the orientation switching of each tilting conveyor unit 10, 11 between the horizontal orientation P1 and the tilted orientation P2/P3 is performed by the tilting motor 12, 13, it is necessary to detect which of the horizontal orientation P1, the left tilted orientation P2, or the right tilted orientation P3 the orientation of each tilting conveyor unit 10, 11 takes. An embodiment of an orientation detecting means for this will be described based on FIG. 2, FIG. 3, and FIG. 10. Four detectors 38a to 38d each are attached front and rear outward to a pair of front and rear vertical plate portions 36a, 36b of the support base 36 in the portal shape in side view provided for arranging the photoelectric sensors 32, 33 between the pair of front and rear tilting conveyor units 10, 11 of each assembly 1A to 1E. Plates to be detected 39 hanging outside the pair of front and rear vertical plate portions 36a, 36b of the support base 36 are attached to the structure 22 so as to adjoin the four detectors 38a to 38d.

Each plate to be detected 39 has a U shape in front view arranged so that the support shaft 7 passes therethrough. Each plate to be detected 39 has both left and right upper end portions attached below the structure 22 of the tilting conveyor unit 10, 11, and includes a plate portion to be detected 39a extending in a direction directly below the support shaft 7 when the tilting conveyor unit 10, 11 is in the horizontal orientation P1. Of the four detectors 38a to 38d, the detector 38a detects the plate portion to be detected 39a when the tilting conveyor unit 10, 11 is in the horizontal orientation P1, the detector 38b detects the plate portion to be detected 39a when the tilting conveyor unit 10, 11 is in the left tilted orientation P2 (45° to the left), the detector 38c detects the plate portion to be detected 39a when the tilting conveyor unit 10, 11 is in the right tilted orientation P3 (45° to the right), and the detector 38d detects the plate portion to be detected 39a when the tilting conveyor unit 10, 11 is in an origin orientation P4 (50° to the left) exceeding the left tilted orientation (45° to the left) by about 5°. As the detectors 38a to 38d, a non-contact proximity switch can be used when the plate portion to be detected 39a is metal, and a capacitance-type non-contact proximity switch can be used even when the plate portion to be detected 39a is plastic. A reflective photoelectric sensor, a horseshoe-shaped (groove-shaped) photoelectric sensor, a contact-type limit switch, etc., can also be used.

According to the above-described orientation detecting means, the control of the tilting motor 12, 13 tilting the tilting conveyor unit 10, 11 is performed based on detection signals of the detectors 38a to 38c, and the tilting motor 12, 13 can be automatically stopped in a target orientation. If the tilting conveyor unit 10, 11 tilted for the orientation switching abnormally stops at an unspecified position within a tilting range from the left tilted orientation P2 (45° to the left) to the right tilted orientation P3 (45° to the right), the tilting conveyor unit 10, 11 is forcibly tilted leftward even if the abnormal stop position cannot be confirmed, and the tilting conveyor unit 10, 11 is temporarily stopped when the detector 38d detects that the tilting conveyor unit 10, 11 reached the origin orientation P4 (50° to the left), and thereafter the tilting conveyor unit 10, 11 can be forcibly restored to any of the left tilted orientation P2, the horizontal orientation P1, and the right tilted orientation P3. That is, when an abnormal stop situation of the tilting conveyor unit 10, 11 occurs, the tilting conveyor unit 10, 11 can be automatically restored to the target orientation effectively by automatically performing the above-described operation with respect to the abnormally stopped tilting conveyor unit 10, 11 without confirming the abnormal stop position visually or by various sensors. The origin orientation P4 may be set at a position beyond the right tilted orientation P3, and an angle from the left tilted orientation P2 or the right tilted orientation P3 to the origin orientation P4 is not limited to the above-described 5° and can be set to any angle.

In the above embodiment, the conveyed object (the tray T) passing between the tilting conveyor units 10, 11 is configured to be detected by the photoelectric sensors 32, 33. However, if needed in terms of control, it can be configured such that a detection of the conveyed object transferring onto the tilting conveyor unit 10 of the assembly 1A at the beginning end from the carry-in conveyor 2 and a detection of the conveyed object transferring onto the carry-out conveyor 3 from the tilting conveyor unit 11 of the assembly 1E at the terminal end can be performed by the photoelectric sensors 32, 33.

Further, the portal plate material 34a straddling the support shaft 7 is exemplified as the support member 34, and the portal plate material 35a straddling the shaft joint 18 as the support member 35. However, the photoelectric sensors 32, 33 may be respectively attached to two plate materials attached to the support base 36. A configuration can also be adopted that the plate materials are cantilevered instead of having the portal shape to attach the photoelectric sensors 32, 33.

In the embodiment illustrated above, the conveyed object conveyed by the conveying means (the belt conveyors 23a, 23b in the embodiment) provided to the tilting conveyor unit is a tray T loading an article to be sorted in practice. However, the conveying and sorting apparatus according to the present invention may directly convey the article to be sorted in practice itself by the conveying means of the tilting conveyor unit. The conveying and sorting apparatus according to the present invention is only required to have a configuration that includes a plurality of tilting conveyor units arranged in a row in the conveying direction, each of the tilting conveyor units supported above the frame so as to be swingable left and right about the support shaft parallel to the conveying direction between the horizontal orientation and the tilted orientation for discharging the conveyed object to the lateral direction with respect to the conveying direction by gravity, and is not limited to the specific structure illustrated in the embodiment.

INDUSTRIAL APPLICABILITY

The conveying and sorting apparatus of the present invention can be utilized as a conveyed object conveying and sorting apparatus such that the conveyed object is loaded and conveyed on a dedicated conveying tray and also required to be sorted automatically according to the destination, as in the luggage conveyance and sorting at airports.

What is claimed is:

1. A conveying and sorting apparatus comprising:
a plurality of tilting conveyor units arranged in a row in a conveying direction, each of the tilting conveyor unites supported above a frame so as to be swingable left and right about a support shaft parallel to the conveying direction between a horizontal conveying orientation and a tilted orientation for discharging a conveyed object to a lateral direction with respect to the conveying direction by gravity;
a reflective photoelectric sensor operable to detect a conveyed object passing between the tilting conveyor units adjacent to each other in the conveying direction via a light beam vertically passing through a gap between the tilting conveyor units is arranged, and the photoelectric sensor is attached to a supported by the frame and arranged at a position around the support shaft;
wherein the support member has a portal plate material having a pair of leg portions located on both sides of the support shaft, and both of the leg portions of the portal plate material are attached on a support base installed on the frame so as to be located below the support shaft.

2. A conveying and sorting apparatus comprising:
a plurality of tilting conveyor units arranged in a row in a conveying direction, each of the tilting conveyor units supported above a frame so as to be swingable left and right about a support shaft parallel to the conveying direction between a horizontal conveying orientation and a tilted orientation for discharging a conveyed object to a lateral direction with respect to the conveying direction by gravity;
a reflective photoelectric sensor operable to detect a conveyed object passing between the tilting conveyor units adjacent to each other in the conveying direction via a light beam vertically passing through a gap between the tilting conveyor units is arranged, and the photoelectric sensor is attached to a support member supported by the frame and arrange at a position around the support shaft;

wherein the support shaft has a connection portion connected by a shaft joint at a position between the tilting conveyor units adjacent to each other in the conveying direction, and the connection portion is provided with a pair of bearings supporting end portions of each support shaft at both sides of the shaft joint and a bearing support base installed above the frame and supporting the pair of bearing, and the photoelectric sensor is arranged at the position between the tilting conveyor units where the connection portion is located is attached to the support member composed of a portal plate material straddling the shaft joint, and the portal plate material has both leg portions attached on the bearing support base.

3. A conveying and sorting apparatus comprising:

a plurality of tilting conveyor units arranged in a row in a conveying direction, each of the tilting conveyor units supported above a frame so as to be swingable left and right about a support shaft parallel to the conveying direction between a horizontal conveying orientation and a fitted orientation for discharging a conveyed object to a lateral direction with respect to the conveying direction by gravity;

a reflective photoelectric sensor operable to detect a conveyed object passing between the tilting conveyor units adjacent to each other in the conveying direction via a arranged, and the photoelectric sensor is attached to a support member supported by the frame and arranged at a position around the support shaft;

wherein the photoelectric sensor is arranged higher than the support shaft in side view.

4. A conveying and sorting apparatus comprising:

a plurality of tilting conveyor units arranged in a row in a conveying direction, each of the tilting conveyor units supported above a frame so as to be swingable left and right about a support shaft parallel to the conveying direction between a horizontal conveying orientation and a lilted orientation for discharging a conveyed object to a lateral direction with respect to the conveying direction by gravity;

a reflective photoelectric sensor operable to detect a conveyed object passing between the tilting conveyor units adjacent to each other in the conveying direction via a light beam vertically passing through a gap between the tilting conveyor units is arranged, and the photoelectric sensor is attached to a support member supported by the frame and arranged at a position around the support shaft;

wherein the photoelectric sensor is attached such that a projection direction of its light beam is tilted on a tilting direction side toward the tilted orientation of the tilting conveyor unit with respect to a vertical direction, and a tilt angle of the projection direction is set to an angle capable of detecting both a conveyed object transferring between the tilting conveyor units when the tilting conveyor units are in the horizontal orientation and a conveyed object transferring between the tilting conveyor units when the tilting conveyor units are in the tilted orientation.

5. A conveying and sorting apparatus including a plurality of tilting conveyor units arranged in a row in a conveying direction, each of the tilting conveyor units supported above a frame so as to be swingable left and right about a support shaft parallel to the conveying direction between a horizontal conveying orientation and a tilted orientation for discharging a conveyed object to a lateral direction with respect to the conveying direction by gravity, wherein a reflective photoelectric sensor detecting a conveyed object passing between the tilting conveyor units adjacent to each other in the conveying direction via a light beam vertically passing through a gap between the tilting conveyor units is arranged, and the photoelectric sensor is attached such that a projection direction of its light beam is tilted on a tilting direction side toward the tilted orientation of the tilting conveyor unit with respect to a vertical direction, and a tilt angle of the projection direction is set to an angle capable of detecting both a conveyed object transferring between the tilting conveyor units when the tilting conveyor units are in the horizontal orientation and a conveyed object transferring between the tilting conveyor units when the tilting conveyor units are in the tilted orientation.

* * * * *